United States Patent [19]
Yokoyama et al.

[11] Patent Number: 5,264,266
[45] Date of Patent: * Nov. 23, 1993

[54] INFORMATION RECORDING MEDIUM INCLUDING AN ORGANIC POLYSILANE AND AN OXO METALLIC PHTHALOCYANING

[75] Inventors: Masaaki Yokoyama, Toyonaka; Mikio Kakui, Minoo, both of Japan

[73] Assignee: Mita Industrial Co., Ltd., Osaka, Japan

[*] Notice: The portion of the term of this patent subsequent to Sep. 9, 2009 has been disclaimed.

[21] Appl. No.: 756,589

[22] Filed: Sep. 9, 1991

[30] Foreign Application Priority Data

Sep. 10, 1990 [JP] Japan .................. 2-240337

[51] Int. Cl.$^5$ .................................................. B32B 3/02
[52] U.S. Cl. ........................................ 428/64; 428/65; 428/913; 369/283; 369/284; 346/1.1; 346/76 L; 430/270
[58] Field of Search .................... 428/64, 65, 913; 369/283, 284; 346/1.1; 430/270

[56] References Cited

U.S. PATENT DOCUMENTS

| | | | |
|---|---|---|---|
| 4,458,004 | 7/1984 | Tanikawa | 430/270 |
| 4,727,171 | 2/1988 | Nagai | 556/430 |
| 5,039,600 | 8/1991 | Tai | 428/64 |
| 5,105,298 | 4/1992 | Schellenberg | 252/585 |
| 5,132,153 | 7/1992 | Hirose et al. | 428/64 |

OTHER PUBLICATIONS

Database WPIL No. 89-244,541, Derwent Publications, Ltd., Jul. 7, 1989.
Database WPIL No. 86-32,520, Derwent Publications, Ltd. Dec. 14, 1985.
Database WPIL No. 86-31,907, Derwent Publications, Ltd., Dec. 13, 1985.

Primary Examiner—Patrick J. Ryan
Assistant Examiner—Marie R. Machoil
Attorney, Agent, or Firm—Beveridge, DeGrandi, Weilacher & Young

[57] ABSTRACT

An information recording medium comprises a recording layer including a mixture of organic polysilane and oxo metallic phthalocyanine pigment. Information is recorded by adding heat or light to the recording layer. In a method for recording information onto the information recording medium, a decoloring reaction of oxo metallic phthalocyanine pigment is used which is caused by heating the recording layer to a temperature equal to or higher than a pyrolyzing point of organic polysilane.

20 Claims, 9 Drawing Sheets

R1, R2 : Lower alkyl, aryl, alkoxy, and acyl radicals, etc

X : Metallic atom

R1, R2, R3, R4 : Substituents of hydrogen atom, halogen atom, alkyl radical, alkoxy radical, aryl radical, aryloxy radical, nitro radical, cyano radical, hydroxyl radical, benzyloxy radical, amino radical, etc.

k, l, m, n : Integers from 0 to 4

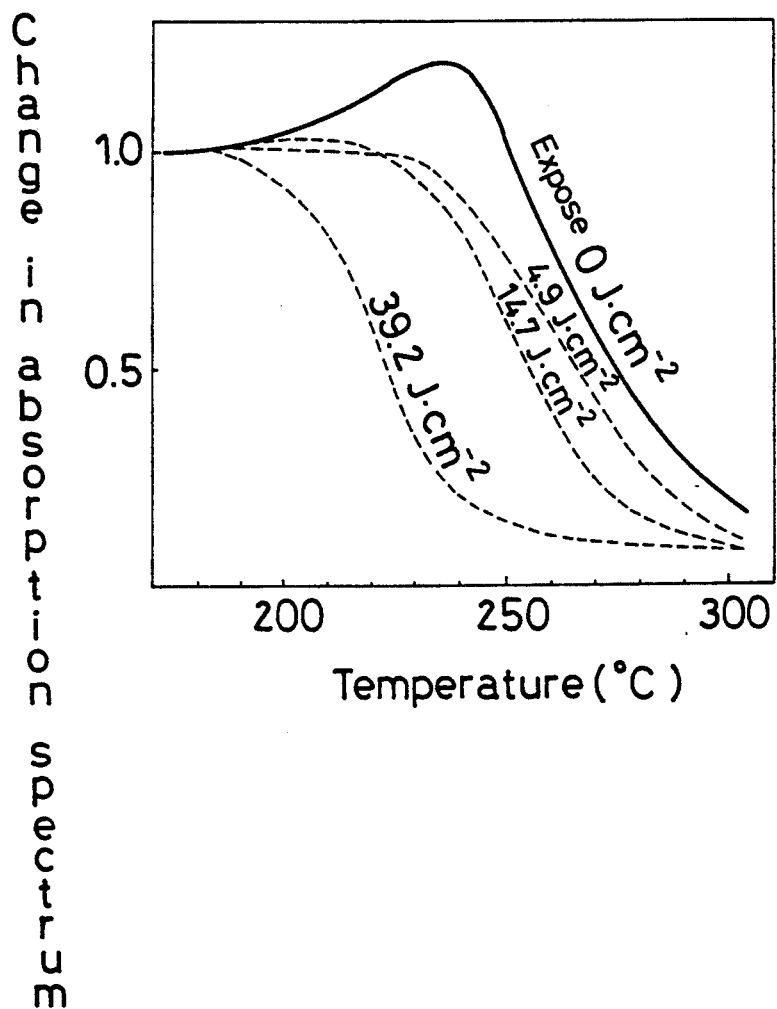

Wavenumber (1/cm)

Wavelength (nm)

INFORMATION RECORDING MEDIUM INCLUDING AN ORGANIC POLYSILANE AND AN OXO METALLIC PHTHALOCYANING

BACKGROUND OF THE INVENTION

1. Field of the Invention

The present invention relates to a non-erasable type information recording medium (where information can be written only once) (for example, optical disks) and an information recording method thereof.

2. Description of the Prior Arts

Optical disks, where a large capacity of information can be recorded in high density, are widely used in an increasing number of fields. There are two types of recording methods for optical disks: a non-erasable (write-once) type where information can be written only once; and an erasable type where information is erasable and rewritable. Of the above two types, the non-erasable type optical disks are often used as sales media for music, movies, etc., since the non-erasable type disks do not allow the re-writing of information and the costs thereof are generally restrained to be low.

Various kinds of information recording methods have been devised for non-erasable optical disks. In all of the methods, information is recorded by irradiating a narrowed laser beam on a recording layer of an optical disk to change the physical/chemical characteristics of the recording layer. The recording methods are roughly classified into two types where the following two modes are used, respectively: a heat mode where a change of the recording layer caused by a heating by laser beam is mainly used; and a photon mode where a change of the recording layer caused by the light (photon) of a laser beam is mainly used. In the heat mode recording method, which includes a punch recording method where tiny holes (pits) are made on the recording layer by a local heating by laser beam, inorganic materials such as compounds of Bi, Re and Te, chalcogenide, etc. whose melting and evaporating temperatures are low are mainly used. Moreover, in the heat mode method and the photon mode method, a refractive index/reflectance changing method is widely used where information is recorded by causing a change in the refractive index and reflectance of the recording layer. In this method, cyanic pigments are used as organic pigments, and chalcogenide, $TeO_2$-Te, etc., as inorganic materials.

As described above, various kinds of materials have been developed as materials for non-erasable optical disks. With respect to the inorganic materials, since the spin coating, which can be easily conducted on the organic materials, of the inorganic materials is difficult, an inefficient process such as evaporation, etc. is required in many cases to form a thin, uniform recording layer on the substrate of an optical disk. Moreover, with respect to the organic pigments such as cyanic pigments, etc., since the organic pigments tend to be decolored by light, it is required to use an optical triplet quencher and to make the organic pigments into metallic complexes to improve the stability, which complicates the manufacturing process.

SUMMARY OF THE INVENTION

An object of the present invention is to provide an information recording medium which is excellent in both producibility and long-term maintainability.

Another object of the present invention is to provide a method for recording information onto the above-described information recording medium.

A first feature of an information recording medium according to the present invention is characterized in that, in an information recording medium for recording information by adding heat or light to a recording layer on a substrate, the recording layer includes a mixture of organic polysilane and oxo metallic phthalocyanine pigment. Moreover, as a second feature, an information recording medium may be provided a first layer including the oxo metallic phthalocyanine pigment and a second layer consisting of the organic polysilane.

As methods for recording information onto the recording layer of the above-described two features, the following methods are effective: i) a method where the decoloring reaction of the oxo metallic phthalocyanine pigment is used which is caused by heating the recording layer to a temperature equal to or higher than the pyrolyzing point of the organic polysilane; and ii) a method where the decoloring reaction of the oxo metallic phthalocyanine pigment is used which is caused by heating the recording layer, on which ultraviolet rays are previously irradiated, to a temperature equal to or higher than the glass transition point of the organic polysilane.

BRIEF DESCRIPTION OF THE DRAWINGS

These and other objects and features of this invention will become clear from the following description taken in conjunction with the preferred embodiments with reference to the accompanied drawings in which:

FIG. 4 is a graph showing a change in the light absorbance, by heating, of the (PhMeSi)x/TiO-Pc lamination layer film which is an embodiment where a quantity of ultraviolet irradiation is the parameter;

DETAILED DESCRIPTION OF THE PREFERRED EMBODIMENT

Figure 3A:
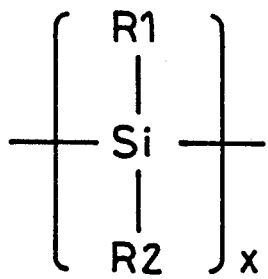
FIGS. 3A and 3B respectively show the chemical formula of the organic polysilane and that of the oxo metallic phthalocyanine pigment.
Figure 3B:
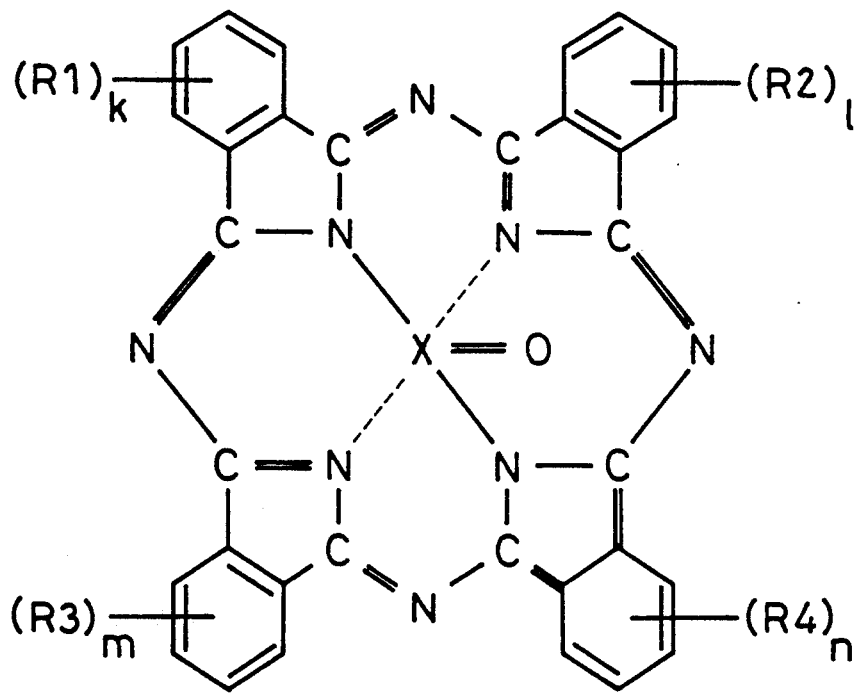

FIGS. 3A and 3B respectively show the chemical formulae of organic polysilane and oxo metallic phthalocyanine pigment which are included in a recording layer of an information recording medium according to the present invention. In FIG. 3A, R1 and R2 represent lower alkyl, aryl, alkoxy, and acyl radicals, etc. In FIG. 3B, X represents a metallic atom; R1, R2, R3 and R4 represent substituents of hydrogen atoms, halogen atoms, alkyl radicals, alkoxy radicals, aryl radicals, aryloxy radicals, nitro radicals, cyano radicals, hydroxyl radicals, benzyloxy radicals, and amino radicals, etc; and k, l, m, and n represent integers from 0 to 4.

Figure 1A:
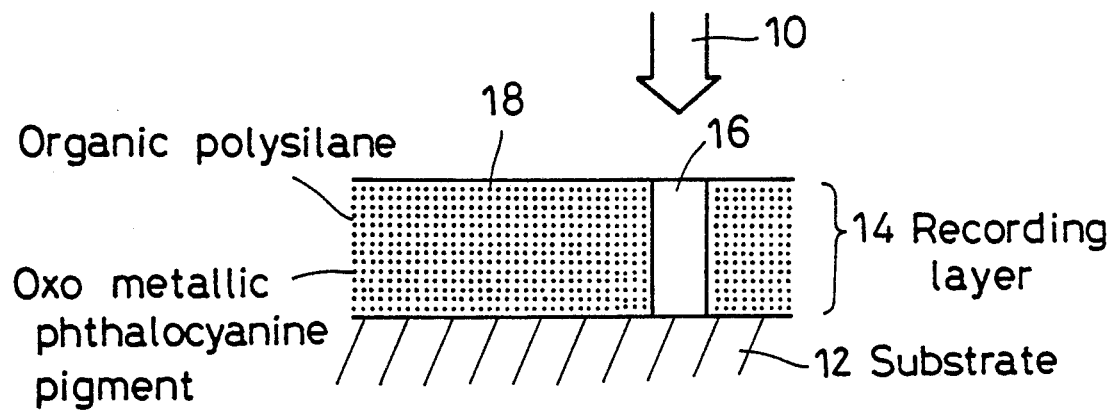
FIG. 1A is a view where information is recorded on an information recording medium which is the first feature of the present invention.

The recording layer is constituted by a mixture of organic polysilane and oxo metallic phthalocyanine pigment (the feature will hereinafter be referred to as a first feature). A first method for recording information onto the recording layer of the first feature will be described. Firstly, organic polysilane decomposes by heating the organic polysilane to a temperature equal to or higher than its pyrolyzing point. Then, the decomposition product decolors the oxo metallic phthalocyanine pigment by reacting on the oxo metallic phthalocyanine pigment. Therefore, as shown in FIG. 1A, by locally heating a recording layer 14 on a substrate 12 of the information recording medium with a laser beam 10, etc., a heated portion 16 is decolored (that is, the light absorbance is changed), so that information where the heated portion 16 represents "1" and a non-heated portion 18 represents "0" (or the reverse) can be recorded.

Next, a second method for recording information onto the recording layer of the first feature will be described. Firstly, ultraviolet rays are previously irradiated on the recording layer. Thereby, a photon decomposition of the organic polysilane is caused. Then, by heating the recording layer to a temperature equal to or higher than the glass transition point of the organic polysilane, the decomposition product produced by the photon decomposition contacts the oxo metallic phthalocyanine pigment, which causes the decoloring reaction of the oxo metallic phthalocyanine pigment. Therefore, in the case shown in FIG. 1A, by locally irradiating ultraviolet rays 10 on the portion 16 in advance and thereafter heating the entire surface of the recording layer 14, only the portion 16 where the ultraviolet rays are irradiated is decolored, so that information can be recorded. Or, by irradiating the ultraviolet rays on the entire surface of the recording layer 14 in advance and thereafter selectively conducting the local heating (with the laser beam 10, etc.), information can also be recorded.

The recording layer may be constituted by a first layer including oxo metallic phthalocyanine pigment and a second layer consisting of organic polysilane (the feature will hereinafter be referred to as a second feature) as well as by the above-described mixture (the first feature). In this case, the first layer may be a layer consisting of only oxo metallic phthalocyanine pigment produced by evaporation, etc. or may be a layer consisting of a mixture of the oxo metallic phthalocyanine pigment and some kind of binder polymer. When the binder polymer is used, however, it is required that its glass transition point is lower than the pyrolyzing point of a organic metallic polysilane.

In a case where information is recorded on a recording layer of the above-described second feature by the above-described first method, the operation therein is nearly the same as that when information is recorded on a recording layer of the first feature by the first method.

Figure 1B:
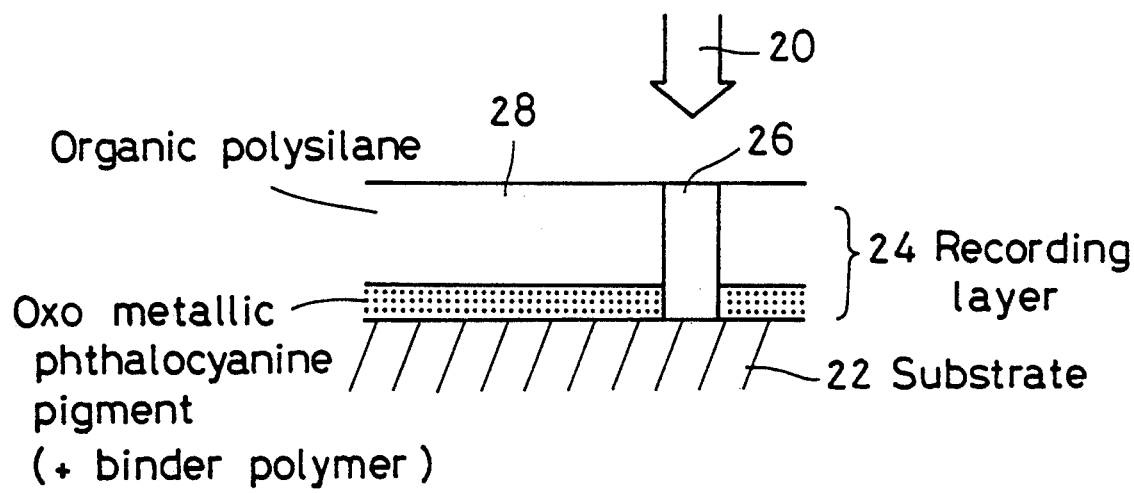
FIG. 1B is a view where information is recorded on an information recording medium which is the second feature of the present invention.

That is, by heating the recording layer to a temperature equal to or higher than the pyrolyzing point of the organic polysilane, the organic polysilane in the second layer decomposes. Since the pyrolyzing point of the organic polysilane is higher than its glass transition point, this heating enables the contact of the organic polysilane in the second layer with the oxo metallic phthalocyanine pigment in the first layer. Thereby, the decomposition product of the organic polysilane reacts on the oxo metallic phthalocyanine pigment, so that the oxo metallic phthalocyanine pigment is decolored. Specifically, as shown in FIG. 1B, by locally heating a recording layer 24 on a medium substrate 22 with a laser beam 20, the organic polysilane on a heated portion 26 of the second layer is pyrolyzed. Since the pyrolyzing temperature of the organic polysilane is higher than its glass transition point, the organic polysilane flows as well as decomposes. Thereby, the second and first layers mix to promote the contact of the organic polysilane with the oxo metallic phthalocyanine pigment, so that only the portion 26 heated by the laser beam 20 is decolored. Therefore, information where the heated portion 26 represents "1" and a non-heated portion 28 represents "0" (or the reverse) can be recorded. As described above, the first layer may consist of only the oxo metallic phthalocyanine pigment, or may consist of a mixed material of the oxo metallic phthalocyanine pigment and binder polymer which softens and flows at the time of the above heating.

When information is recorded on the information recording medium of the second feature by the second method, the photon decomposition of the organic polysilane in the second layer is caused by the previous ultraviolet ray irradiation. However, since the heating is not conducted at this point of time, the decomposition product remains within the second layer. Thereafter, by heating the recording layer, the second and first layers mix in a manner similar to the above-described case, and the decoloring reaction of the oxo metallic phthalocyanine pigment is caused by the contact of the organic polysilane with the oxo metallic phthalocyanine pigment. In this case, there are also two kinds of methods for recording information: a method where firstly the local ultraviolet ray irradiation is selectively conducted and thereafter the entire surface is heated; and a method where firstly the ultraviolet rays are irradiated on the entire surface and thereafter the local heating is selectively conducted.

Figure 2:
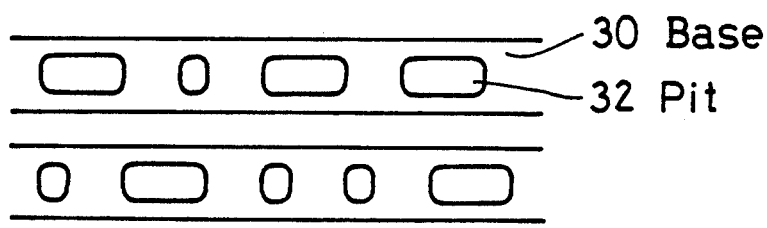
FIG. 2 is a plan view showing recording pits of an optical disk.

In any of the above-described methods, as shown in, for example, FIG. 2, various information can be recorded by forming with laser beam, etc. pits 32, which are decolored portions, in a base 30 colored by the oxo metallic phthalocyanine pigment. The information can be read by detecting the difference among the light absorbance of each portion (that is, bases 18, 28 and 30, and pits 16, 26 and 32) by scanning the recording layers 14 and 24 with low-energy laser beam.

A more detailed description of the embodiment of the present invention will hereinafter be given with reference to the drawings.

Formation of a Lamination Layer Film

Firstly, phenylmethylpolysilane (PhMeSi)x was produced as an embodiment of the organic polysilane. The following is the method. Under the existence of 13 g metallic sodium, 50 g phenylmethyldichlorosilane (0.28 mol) was heated to 135° C. in 200 ml dry toluene, and was reacted for approximately 11 hours while being agitated. After a cooling, ethanol was added to the solution where dark violet precipitation had been deposited to make the sodium which had not reached into ethoxide. After the precipitation was filtered out, the solution was dried, and was dissolved in toluene. The solution was dropped into ethanol and re-precipitated to obtain phenylmethylpolysilane. The yield of the phenylmethylpolysilane was 10.2 g and 34%. In FIG. 3A showing the phenylmethylpolysilane, R1 represents the phenyl radical and R2 represents the methyl radical.

Next, titanylphthalocyanine TiO-Pc (shown in FIG. 3B) as an example of the oxo metallic phthalocyanine pigment where Ti is a metal X. The titanylphthalocyanine used was α type manufactured by Sanyo Shikiso Co., Ltd. The lamination layer film consisting of the α type and phenylmethylpolysilane was produced as hereinafter described. Ninety-mg titanylphthalocyanine was added to 6 ml tetrahydrofuran (THF). After kneading for a whole day and night in a ball mill, it was dispersed. Ninety-mg polyvinyl butyral (S-LEC BM-2 manufactured by Sekisui Chemical Co., Ltd. was used) was added thereto, and it was dispersed in a ball mill for one more hour to be made into a coating liquid. This was spin-coated on a transparent glass substrate (silica glass or slide glass) to form a titanylphthalocyanine dispersion film. Next, 35 mg phenylmethylpolysilane was dissolved in 0.35 ml benzene, and it was spin-coated on the titanylphthalocyanine dispersion film to form a (PhMeSi)x/TiO-Pc lamination layer film. In both of the titanylphthalocyanine dispersion film and the phenylmethylpolysilane film, uniform layers were extremely easily obtained by the spin-coating.

Recording characteristics of the Lamination Layer Film

FIG. 4 shows a change in the absorbance (at 25° C.), to a 690 nm red light, of the (PhMeSi)x/TiO-Pc lamination layer film formed as described above when the lamination layer film was heated to 300° C. after ultraviolet rays having intensities of 0 J/cm$^2$ to 39.2 J/cm$^2$ were irradiated at room temperature. The ultraviolet light intensities were 0.0, 4.9, 14.7, and 39.2 Joules per square centimeter. From the figure, it is understood that, for example, when the lamination layer film is heated to approximately 240° C., there is a large difference in absorbance between the portion where ultraviolet rays were irradiated (39.2 J/cm$^2$) and the portion where it was not irradiated (0 J/cm$^2$). This means that pits of extremely high contrast are obtained by using this lamination layer film for the recording layer of an optical disk and by adopting the recording method of the ultraviolet ray irradiation and heating to 240° C.

Principle of the Recording

Figure 5:
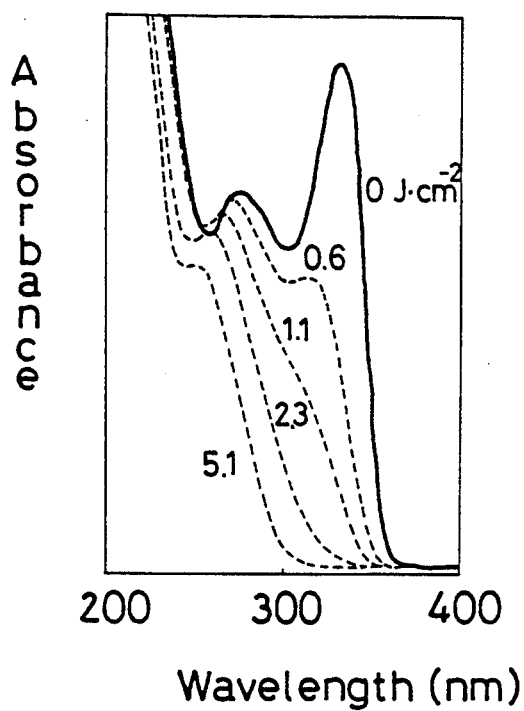
FIG. 5 is a graph showing the absorption spectra after an ultraviolet ray irradiation where a quantity of ultraviolet irradiation on the (PhMeSi)x/TiO-Pc lamination layer film is the parameter.
Figure 6:
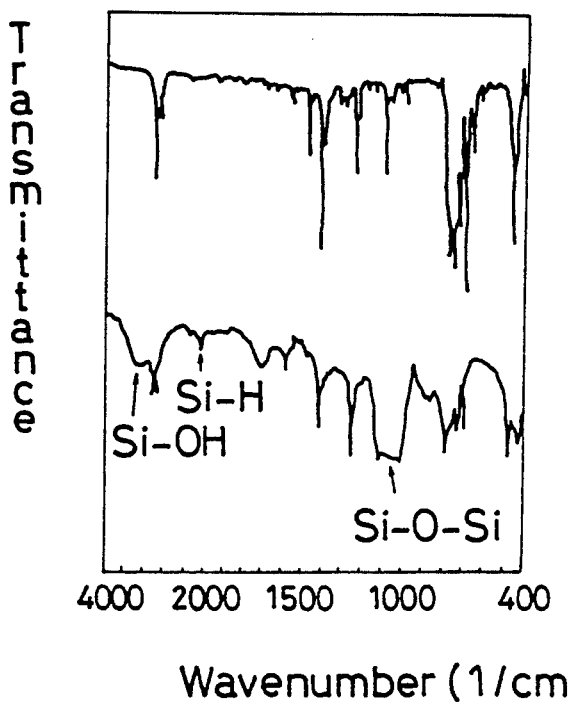
FIG. 6 is a graph showing a result of an FT-IR measurement before (the upper) and after (the lower) ultraviolet rays are irradiated on phenylmethylpolysilane which is an embodiment of the invention.

In order to search the cause of such a recording characteristic of the (PhMeSi)x/Tio-Pc lamination layer film, firstly, the decomposition of phenylmethylpolysilane by the irradiation of ultraviolet rays was examined. After 300 nm to 400 nm ultraviolet rays having intensities of 0 J/cm$^2$ to 5.1 J/cm$^2$, respectively, were irradiated to a simple component film of phenylmethylpolysilane, the absorbance of the film to 200 nm to 400 nm ultraviolet rays was measured. FIG. 5 shows the result at intensities of 0.0, 0.6, 1.1, 2.3 and 5.1 Joules per square centimeter. A peak of $\lambda_{MAX}=331$ nm which appears when ultraviolet rays are not irradiated (0 J/cm$^2$) rapidly disappears after ultraviolet rays are irradiated. Since the peak of $\lambda_{MAX}=331$ nm corresponds to an Si-Si compound which is the principal chain of phenylmethylpolysilane, it is understood that the Si-Si compound which is the principal chain is cut off by the irradiation of ultraviolet rays. Moreover, FIG. 6 shows an FT-IR spectrum of phenylmethylpolysilane measured before and after the irradiation of ultraviolet rays (the upper is before the irradiation, and the lower is after the irradiation), where the existence of Si-OH compound and Si-O-Si compound is confirmed. From the above, it is understood that by irradiating ultraviolet rays on phenylmethylpolysilane, the Si-Si compound which is the principal chain is cut off to form a polymer having a bond in siloxane.

The formation of the siloxane chain (Si-O-Si) which is a loose compound by the decomposition of phenylmethylpolysilane shows that the phenomenon that the degree of freedom of polymer movement at the ultraviolet-ray-irradiated portion is improved (that is, a glass transition point Tg is decreased) is one of the causes of a shift (see FIG. 4) of the decoloring reaction toward a low temperature side.

Figure 7:
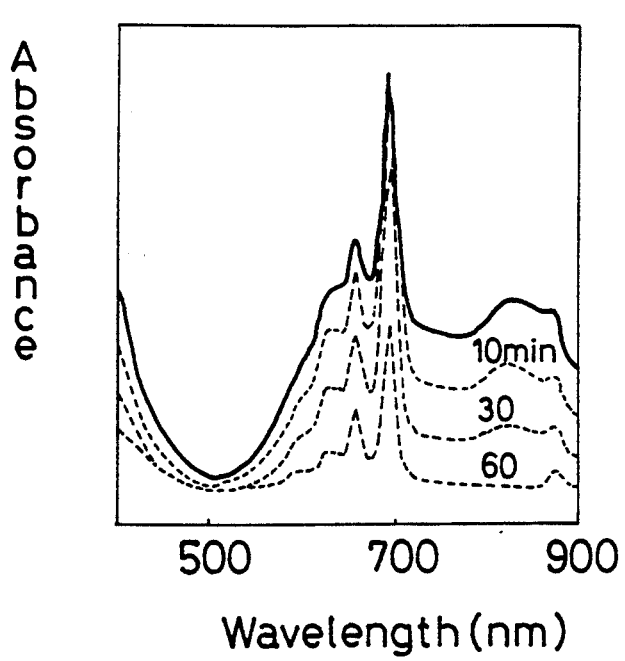
FIG. 7 is a graph showing a change in the absorption spectra when ultraviolet rays are irradiated on a solution where titanylphthalocyanine is dispersed in a toluene solution of phenylmethylpolysilane.

Next, in order to examine the decoloring reaction of titanylphthalocyanine TiO-Pc, an examination was made with a dispersion solution of titanylphthalocyanine. Titanylphthalocyanine was dispersed in a toluene solution of phenylmethylpolysilane, and after ultraviolet rays were irradiated thereon for 0 to 60 minutes, the absorption spectra of the solution were measured. FIG. 7 shows the result after 0, 10, 30, and 60 minutes of irradiation. It is understood that in a dispersion solution where a free contact of phenylmethylpolysilane and titanylphthalocyanine is possible, the decoloring reaction is caused only by the irradiation of ultraviolet rays.

Figure 8:
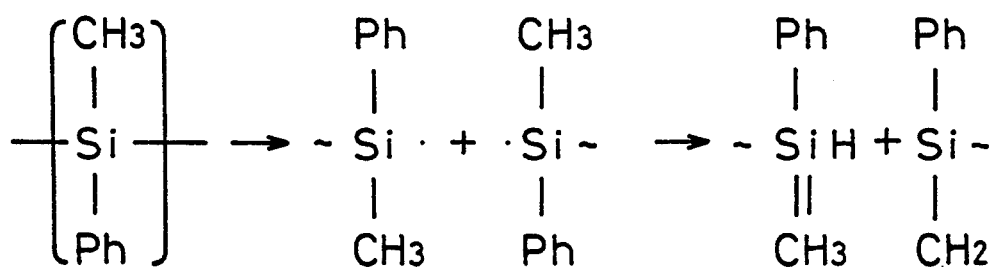
FIG. 8 shows the chemical formula showing a process of decomposition of phenylmethylpolysilane by photon or heat.

As a result of the above research, it is considered that the decoloring phenomenon of the (PhMeSi)x/TiO-Pc lamination layer film is caused in the following process. Firstly, by the irradiation of ultraviolet rays, the Si-Si compound of phenylmethylpolysilane is cut off as shown in FIG. 8, so that decomposition products such as silyl radical, siloxane compound, Si-H compound, etc. are produced. When the temperature is not high, however, the decoloring reaction of titanylphthalocyanine pigment is not caused, since these decomposition products cannot move from the phenylmethylpolysilane layer to the titanylphthalocyanine layer. When the lamination layer film is heated to a temperature equal to or higher than the glass transition point temperature Tg of phenylmethylpolysilane, phenylmethylpolysilane having the silyl radical and siloxane compound moves to the titanylphthalocyanine layer, and decomposes a phthalocyanine ring to decolor the titanylphthalocyanine pigment.

Figure 9:
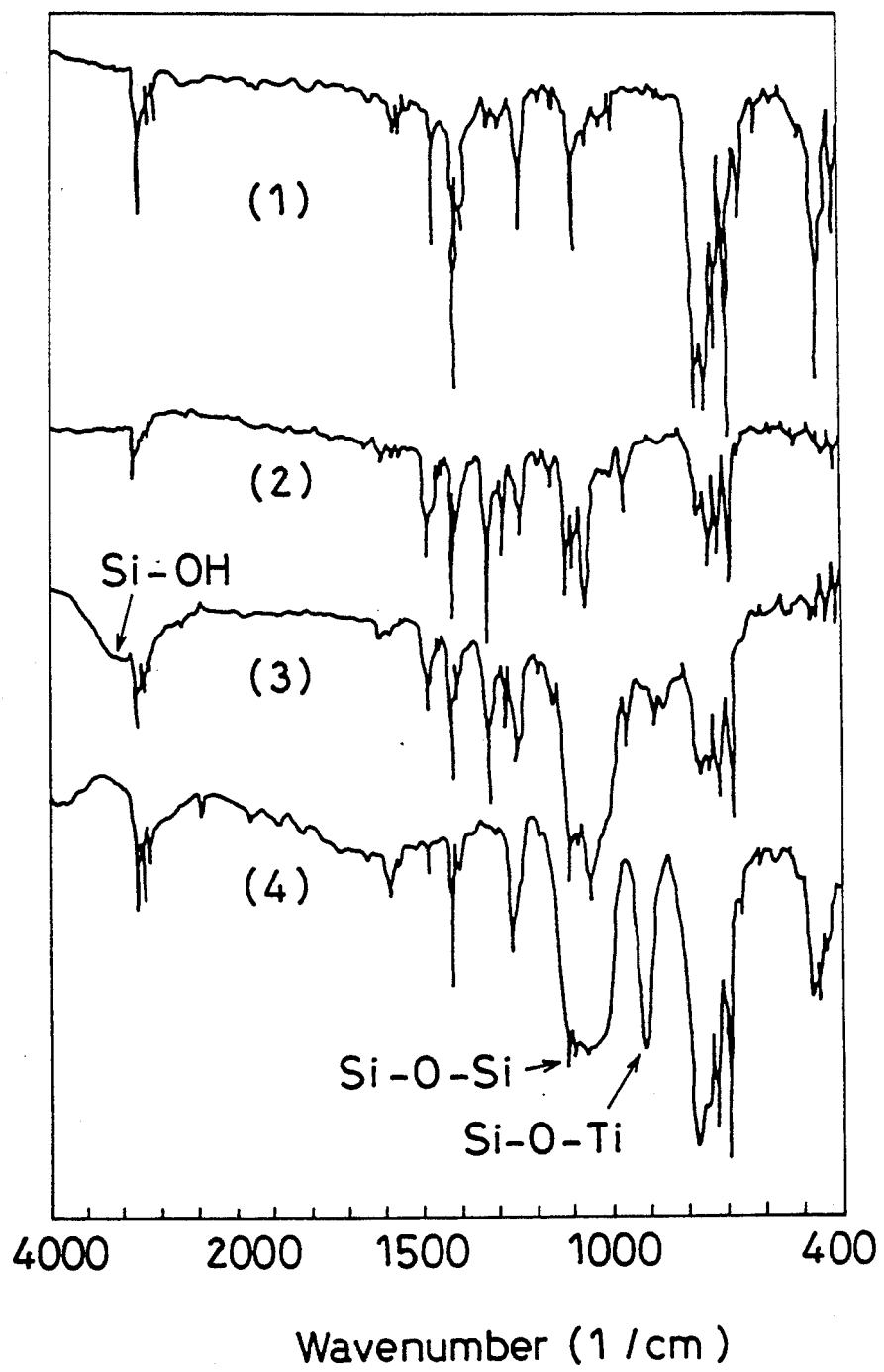
FIG. 9 is a graph showing a result of the FT-IR measurement of each of (1) only phenylmethylpolysilane (PhMeSi)x, (2) the (PhMeSi)x/TiO-Pc lamination layer film, (3) after ultraviolet rays are irradiated on the (PhMeSi)x/TiO-Pc lamination layer film for two hours, and (4) after the lamination layer film is heated at 250° C. and decolored.

FIG. 9 shows the result of the FT-IR measurement in each of the following conditions: (1) only phenylmethylpolysilane (PhMeSi)x; (2) the (PhMeSi)x/TiO-Pc lamination layer film; (3) after ultraviolet rays are irradiated on the (PhMeSi)x/TiO-Pc lamination layer film for two hours; and (4) after, further to the condition (3), the lamination layer film is heated at 250° C. and decolored. By comparing (1) and (2), it is confirmed that absorption peaks 1330, 1280, 1120, 1060 and 890 cm$^{-1}$ shown by a mark ◯ in (2) are those of titanylphthalocyanine pigment. These peaks still remain after the irradiation of ultraviolet rays (3), although it is hidden in a large absorption band of 1000 to 1100 cm$^{-1}$ showing the formation of the Si-O-Si compound by the photon oxidation of the organic polysilane. After the heating (4), however, these peaks shown by the mark ◯ disappear, and instead, the peak (approximately 920 cm$^{-1}$) of Si-O-Ti compound that is speculated to be a reaction product of Si-OH compound, which is a decomposition product of phenylmethylpolysilane after the irradiation of ultraviolet rays (3) and titanylphthalocyanine pigment, is generated.

As described above, this embodiment showed that by heating the (PhMeSi)x/TiO-Pc lamination layer film to an appropriate temperature after the irradiation of ultraviolet rays, information can be recorded with an extremely high contrast. Moreover, as its mechanism, it was clarified that the Si-Si principal chain of the organic polysilane is decomposed by the previous ultraviolet ray irradiation, and active species such as silyl radical, etc. which is the decomposition product thereof reacts on the oxo metallic phthalocyanine pigment to decolor the oxo metallic phthalocyanine pigment.

Further, as shown by the solid line in FIG. 4, that the decoloring reaction is caused even by only heating without previously irradiating ultraviolet rays on the lamination layer film is substantiated by the data showing that the absorbance of a lamination layer film on which ultraviolet rays are not irradiated (0 J/cm$^2$) largely decreases by heating the film to approximately 300° C.

FIG. 4 further shows that even after a large amount of ultraviolet rays (39.2 J/cm$^2$) are irradiated, the decoloring does not occur until the temperature reaches 200° C. Therefore, the recording layer where information is once recorded is extremely stable in a normal condition (at room temperature), so that a high contrast at the time of the recording is maintained for a long period of time. The information recording medium (optical disk) before the recording also has the characteristic of high stability.

Figure 10:
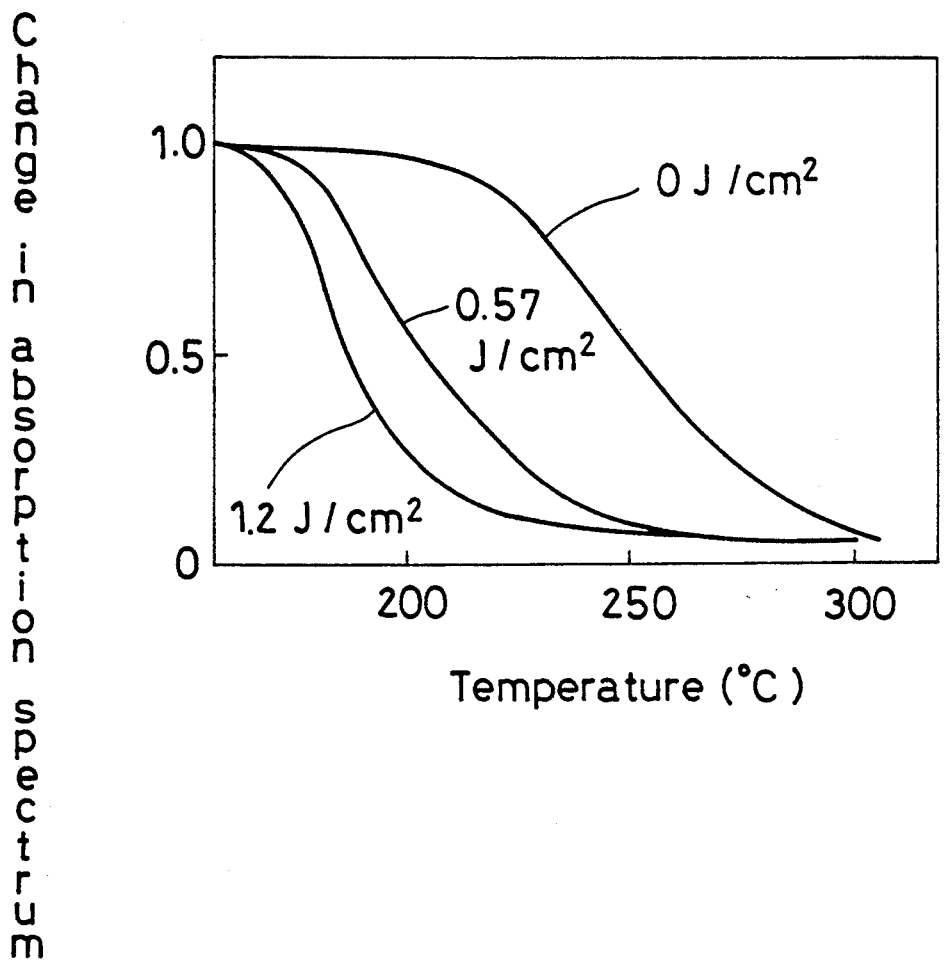
FIG. 10 is a graph showing a change in the light absorbance, by heating, of the (PhMeSi)x/TiO-Pc lamination layer film when the first layer is an evaporation film of the simple body of oxo metallic phthalocyanine pigment, where a quantity of ultraviolet radiation is the parameter.

In the above-described embodiment, a mixture of oxo metallic phthalocyanine pigment with a binder (phenylmethylpolysilane) whose glass transition point is relatively low was used as the first layer of the lamination layer film. FIG. 10 is a graph showing a change (the conditions are the same as those in FIG. 4 of the above-described embodiment) in the light absorbance according to the heating temperature when the first layer of the lamination film is an evaporation layer consisting of only oxo metallic phthalocyanine pigment and the second layer consists of phenylmethylpolysilane, where a quantity of ultraviolet irradiation is the parameter. The irradiation intensities in FIG. 10 are 0.0, 0.57 and 1.2 Joules per square centimeter. The relation nearly the same as that shown in FIG. 4 is obtained, from which it is understood that quantitatively, the above-described examination applies to this case. The temperature at which the light absorbance decreases, however, is closer to the low temperature side compared with the case in FIG. 4, so that the decoloring reaction is caused at a lower temperature.

In the above description, a more detailed description of only the second feature (the lamination layer construction) of the present invention was given. From the results of the above-described various experiments, however, it is clear that when a dispersion-type recording layer is formed by mixing the organic polysilane and the oxo metallic phthalocyanine pigment (the first feature), information can be recorded with a high contrast by using the recording layer as an information recording medium similarly to the above-described embodiment of the lamination layer construction.

As understood from the above-described embodiment, according to the present invention, since information pits with an extremely high contrast can be recorded, the reading of information is trustworthy and the speed for the reading can be increased. From the standpoint of the manufacturing, in the case where any of the features (monolayer and lamination layer) of the present invention is adopted, since the spin coating which is an extremely efficient method can be used, the efficiency in manufacturing information recording media is increased while its cost is decreased. Furthermore, since the recording materials according to the present invention are stable both thermally and chemically, the custody before and after the recording is easy, and there is no possibility that errors of information are made by the decolorization during the custody.

Obviously, many modifications and variations of the present invention are possible in light of the above teachings. It is therefore to be understood that within the scope of the appended claims, the invention may be practiced other than as specifically described.

What is claimed is:

1. An information recording medium for recording information by adding heat or light to a recording layer on a substrate, wherein said recording layer includes a mixture of organic polysilane and oxo metallic phthalocyanine pigment, and wherein information is capable of being recorded on the information recording medium by use of a decoloring reaction between the organic polysilane and the oxo metallic phthalocyanine.

2. An information recording medium as claimed in claim 1, wherein said organic polysilane is phenylmethylpolysilane.

3. An information recording medium as claimed in claim 1, wherein said oxo metallic phthalocyanine pigment is titanylphthalocyanine.

4. An information recording medium as claimed in claim 1, wherein said organic polysilane is phenylmethylpolysilane and said oxo metallic phthalocyanine pigment is titanylphthalocyanine.

5. An information recording medium for recording information by adding heat or light to a recording layer on a substrate, wherein said recording layer comprises a first layer including oxo metallic phthalocyanine pigment and a second layer consisting of organic polysilane, and wherein information is capable of being recorded on the information recording medium by use of a decoloring reaction between the organic polysilane and the oxo metallic phthalocyanine.

6. An information recording medium as claimed in claim 5, wherein said organic polysilane is phenylmethylpolysilane.

7. An information recording medium as claimed in claim 5, wherein said oxo metallic phthalocyanine pigment is titanylphthalocyanine.

8. An information recording medium as claimed in claim 5, wherein said organic polysilane is phenylmethylpolysilane and said oxo metallic phthalocyanine pigment is titanylphthalocyanine.

9. An information recording medium for recording information by applying heat or ultraviolet radiation to a recording layer on a substrate, wherein said recording layer includes an organic polysilane and an oxo metallic phthalocyanine pigment, wherein said organic polysilane and said oxo metallic phthalocyanine pigment are selected so as to react together after exposure to both heat and ultraviolet radiation in a decoloring reaction, and wherein information is capable of being recorded on the information recording medium by the decoloring reaction which takes place between the organic polysilane and the oxo metallic phthalocyanine.

10. An information recording medium as claimed in claim 9, wherein said organic polysilane is phenylmethylpolysilane.

11. An information recording medium as claimed in claim 9, wherein said oxo metallic phthalocyanine pigment is titanylphthalocyanine.

12. An information recording medium as claimed in claim 9, wherein said organic polysilane is phenylmethylpolysilane and said oxo metallic phthalocyanine pigment is titanylphthalocyanine.

13. An information recording medium as claimed in claim 9, wherein said organic polysilane and said oxo metallic phthalocyanine are present in a single layer.

14. An information recording medium as claimed in claim 9, wherein said organic polysilane and said oxo metallic phthalocyanine are present in separate layers.

15. An information recording medium with information recorded thereon by applying heat or light to a recording layer on a substrate, wherein said recording layer includes an organic polysilane and an oxo metallic phthalocyanine pigment, wherein said organic polysilane and said oxo metallic phthalocyanine pigment are selected so as to react together after exposure to both heat and light in a decoloring reaction, and wherein information is recorded on the information recording medium by the decoloring reaction which takes place between the organic polysilane and the oxo metallic phthalocyanine.

16. An information recording medium as claimed in claim 15, wherein said organic polysilane is phenylmethylpolysilane.

17. An information recording medium as claimed in claim 15, wherein said oxo metallic phthalocyanine pigment is titanylphthalocyanine.

18. An information recording medium as claimed in claim 15, wherein said organic polysilane is phenylmethylpolysilane and said oxo metallic phthalocyanine pigment is titanylphthalocyanine.

19. An information recording medium as claimed in claim 15, wherein said organic polysilane and said oxo metallic phthalocyanine are present in a single layer.

20. An information recording medium as claimed in claim 15, wherein said organic polysilane and said oxo metallic phthalocyanine are present in separate layers.

* * * * *